(12) United States Patent
Tione et al.

(10) Patent No.: US 12,060,048 B2
(45) Date of Patent: Aug. 13, 2024

(54) MAINTENANCE SYSTEM

(71) Applicant: FAIVELEY TRANSPORT ITALIA S.P.A., Piossasco (IT)

(72) Inventors: Roberto Tione, Lauriano (IT); Angelo Grasso, Canelli (IT)

(73) Assignee: Faiveley Transport Italia S.P.A., Piossasco (IT)

(*) Notice: Subject to any disclaimer, the term of this patent is extended or adjusted under 35 U.S.C. 154(b) by 266 days.

(21) Appl. No.: 17/572,365

(22) Filed: Jan. 10, 2022

(65) Prior Publication Data

US 2022/0126798 A1   Apr. 28, 2022

Related U.S. Application Data (63) Continuation-in-part of application No. 15/766,545, filed as application No. PCT/IB2016/056004 on Oct. 7, 2016, now abandoned.

(30) Foreign Application Priority Data

Oct. 9, 2015 (IT) .......... 102015000059848

(51) Int. Cl.
  *B60T 8/171* (2006.01)
  *B60T 8/17* (2006.01)
  *B60T 8/88* (2006.01)

(52) U.S. Cl.
  CPC ............ *B60T 8/171* (2013.01); *B60T 8/1705* (2013.01); *B60T 8/885* (2013.01); *B60T 2250/04* (2013.01); *B60T 2270/413* (2013.01)

(58) Field of Classification Search
  CPC ........ B60T 8/1705; B60T 8/171; B60T 8/885; B60T 2250/04; B60T 2270/413
  USPC .......................................................... 701/19
  See application file for complete search history.

(56) References Cited

U.S. PATENT DOCUMENTS

| | | | | |
|---|---|---|---|---|
| 5,492,192 | A * | 2/1996 | Brooks ................ | B60T 8/3205 701/84 |
| 7,274,985 | B2 * | 9/2007 | Nagaya ................ | B60K 28/16 701/84 |
| 8,626,417 | B2 * | 1/2014 | Oral ................ | B60W 30/18172 701/85 |
| 2005/0256629 | A1 * | 11/2005 | Tao ..................... | B60W 20/00 701/87 |
| 2007/0181355 | A1 * | 8/2007 | Harris ................... | B60L 58/33 180/65.21 |

(Continued)

FOREIGN PATENT DOCUMENTS

| BR | 8905551 A | * | 5/1990 | ............ B60L 3/102 |
|---|---|---|---|---|
| DE | 3930302 A1 | * | 5/1990 | ............ B60K 28/10 |

(Continued)

*Primary Examiner* — Atul Trivedi
(74) *Attorney, Agent, or Firm* — K&L Gates LLP (57) ABSTRACT

A system that includes a first control unit having one or more processors. The one or more processors may operate a first traction control unit and a first braking device of a first vehicle of a vehicle system based on an operator input command signal. The system also includes a second control unit in communication with the first control unit and having one or more processors configured to operate a second traction device and a second braking device of a second vehicle of the vehicle system based on at least one operational objective of the vehicle system.

20 Claims, 2 Drawing Sheets

(56) References Cited

U.S. PATENT DOCUMENTS

| | | | | |
|---|---|---|---|---|
| 2009/0112437 | A1* | 4/2009 | Luehrsen | B60W 30/188 |
| | | | | 701/84 |
| 2010/0065358 | A1* | 3/2010 | Harris | B60W 10/10 |
| | | | | 180/65.265 |
| 2010/0076660 | A1* | 3/2010 | Folk | B60K 28/16 |
| | | | | 701/84 |
| 2014/0074328 | A1* | 3/2014 | Schaffler | B60L 7/00 |
| | | | | 903/902 |
| 2015/0217790 | A1* | 8/2015 | Golden | B60T 17/228 |
| | | | | 701/19 |
| 2016/0009304 | A1* | 1/2016 | Kumar | B61L 27/40 |
| | | | | 701/19 |
| 2023/0174029 | A1* | 6/2023 | Subramanian | B60T 8/1725 |
| | | | | 701/76 |
| 2023/0174030 | A1* | 6/2023 | Yang | B60T 8/17551 |
| | | | | 701/70 |
| 2023/0174079 | A1* | 6/2023 | Subramanian | B60T 8/92 |
| | | | | 701/1 |

FOREIGN PATENT DOCUMENTS

| | | | | | |
|---|---|---|---|---|---|
| DE | 102012204671 | A1 | * | 9/2013 | ............ B60T 8/172 |
| DE | 102019127034 | A1 | * | 4/2020 | ............ B60K 1/00 |
| EP | 1982887 | A1 | * | 10/2008 | ............ B60T 8/171 |
| EP | 1982888 | A1 | * | 10/2008 | ............ B60T 8/171 |
| RU | 2470814 | C2 | * | 12/2012 | ......... B61L 15/0027 |
| RU | 2484994 | C2 | * | 6/2013 | ............ B61L 25/025 |

* cited by examiner

FIG. 3

MAINTENANCE SYSTEM

CROSS-REFERENCE TO RELATED APPLICATIONS

This application is a continuation-in-part of U.S. patent application Ser. No. 15/766,545 (filed 4 Apr. 2018), which is a U.S. National Stage Application of International Patent Application No. PCT/M2016/056004, filed on Oct. 7, 2016, which claims priority to Italian Patent Application No. 102015000059848, filed on Oct. 9, 2015, the entire disclosures of which are incorporated herein by reference in their entirety.

BACKGROUND

Technical Field

The subject matter described herein relates to a traction and braking control system for a vehicle.

Description of the Art

In existing vehicle systems that include plural propelling vehicles such as rail vehicles, the propelling vehicles execute traction and braking commands given by the driver of the vehicle system. Typically, the driver is on a lead vehicle, and provides commands from a control unit of the lead vehicle.

Such control systems have the advantage of being simple to operate, and the driver of the leading propelling vehicle drives the vehicle system as if it were at a front end of the vehicle system. However, such systems also have a limited capacity to control slack action. Indeed, on certain section profiles, such control systems may not be able to limit the occurrence of significant longitudinal forces between the vehicles that make up the vehicle system, in extension or in compression, resulting in dangerous stresses and accident risks.

Devices to help with driving and event recording that are designed to "predict" the future state of a vehicle system on the basis of the traction and braking commands given by the driver are known. However, such systems are based on the ability of the driver to use personal experience to "interpret" the predictive information provided and to subsequently give commands. Such systems also fail to address the problem of controlling slack action between vehicles in route sections with "difficult" route profiles.

BRIEF DESCRIPTION

In accordance with one or more embodiments, a vehicle system is provided that may include a first vehicle having a first traction device and a first braking device. The first vehicle may also have a first control unit including a first sensor that may provide first speed signals indicating one or more of a speed or an acceleration of the first vehicle. The first control unit may also include a second sensor may obtain an operator input command signal to the first traction device or the first braking device. The first control unit may also include one or more processors may operate the first traction control unit and the first braking device based on the command signal. The vehicle system may also include a second vehicle having a second traction device and a second braking device. The second vehicle may also have a second control unit in communication with the first control unit. The second control unit may also include one or more processors may operate the second traction device and the second braking device based on at least one operational objective of the vehicle system.

In accordance with one or more embodiments, a method is provided that may include obtaining with a first control unit of a first vehicle of a vehicle system at least one operational objective of the vehicle system, and receiving an operator input command signal. The method may also include operating a first traction device and a first braking device based on the command signal, and obtaining with a second control unit of a second vehicle of the vehicle system the at least one operational objective. The method may also include operating a second traction device and a second braking device based on the at least one operational objective.

In accordance with one or more embodiments, a vehicle system is provided that may include a first vehicle having a first traction device and a first braking device. The first vehicle may also have a first control unit including a first sensor that may provide first speed signals during a trip indicating one or more of a speed or an acceleration of the first vehicle. The first control unit may also include a second sensor that may obtain an operator input command signal during the trip. The first control unit may also include one or more processors that may operate the first traction control unit and the first braking device based on the command signal and in response to receiving the operator input command signal. The vehicle system may also include a second vehicle having a second traction device and a second braking device. The second vehicle may also have a second control unit in communication with the first control unit. The second control unit may include one or more processors that may operate the second traction device and the second braking device based on at least one operational objective of the vehicle system, and not in response to receiving the operator input command signal.

BRIEF DESCRIPTION OF THE DRAWINGS

The inventive subject matter may be understood from reading the following description of non-limiting embodiments, with reference to the attached drawings, wherein below.

DETAILED DESCRIPTION

One or more embodiments a traction and braking control system for a vehicle system has been improved to enable a more effective management operating the vehicle system.

A vehicle system is provided that utilizes a traction and braking control system. The vehicle system includes plural propulsion vehicles and non-propulsion vehicles. The propulsion vehicles may include a first vehicle that is a lead vehicle and one or more second vehicles that can be a trailing vehicle.

The traction and braking control system may include a first control unit associated with the first vehicle that has a sensor designed to provide the first control unit with signals indicating the speed and/or acceleration of the lead, or first vehicle based on inputs applied by the operator to generate operator input command signals for a traction device and a braking device. The first control unit also includes a memory for storing data indicating the composition of the vehicle system, data defining a mathematical model of the longitudinal dynamics of the vehicle system, as well as data defining a profile of the section on which the vehicle system is travelling, and data defining at least one predetermined operational objective. The first control unit may additionally include a positioning system for providing position data that indicates the instantaneous position of the vehicle system along a section or route. The first control unit may also include a human-machine interface for providing information, including instructions to the operator. The control unit may check whether command signals generated based on the inputs given by the operator for the traction control device and the braking control device are consistent with an operational objective. If the command signals are not consistent, the human-machine interface may provide the operator with instructions on how to operate said control devices to achieve said objective.

The vehicle system may also include a second control unit on a second vehicle, where the second vehicle may be a propulsion vehicle that is a trailing vehicle. The second control unit may generate, in a predetermined manner and as a function of the data stored in said memory including at least one operational objective, and as a function of the information provided by the sensor and the positioning control, command signals for controlling a second traction device and/or second braking device of the second vehicle.

In one embodiment, the first control unit of the first vehicle is also designed to generate, in a predefined manner, additional signals for controlling traction and/or braking, and to use said additional command signals to control the braking and traction apparatus.

Figure 1:
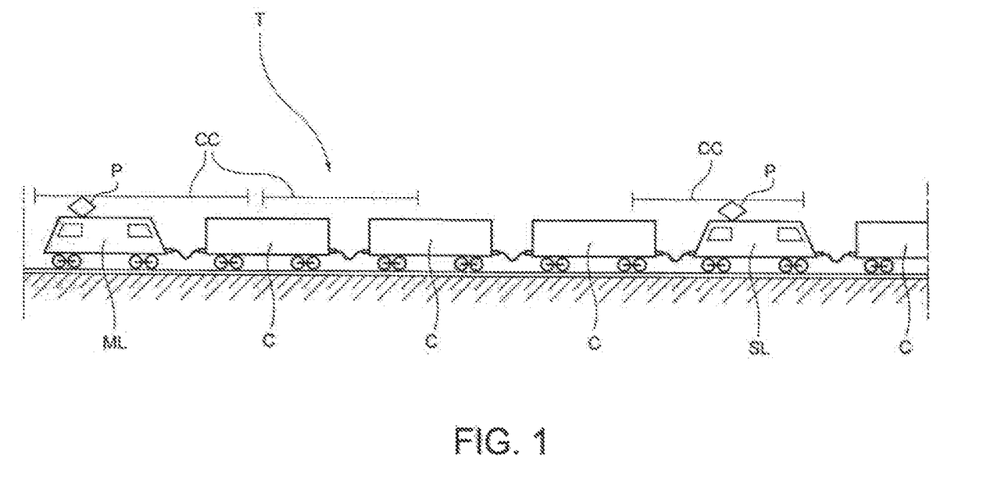
FIG. 1 is a partial schematic side view of a vehicle system.

In one example, the first vehicle and the second vehicle are both propulsion vehicles for propelling the vehicle system forward. In the embodiment shown schematically in FIG. 1, the first (e.g. lead) vehicle and second (e.g. trailing) vehicle may be electrically powered by and overhead conductor CC via respective pantographs P. In other examples, the propulsion vehicles may be mechanically powered, both mechanically and electrically powered, hydraulically powered, pneumatically powered, any combination thereof, or the like. The vehicle system may also include non-propulsion vehicles such as cars or carriages C. The vehicle system may include multiple propulsion-generating vehicles and/or multiple non-propulsion-generating vehicles that are mechanically coupled. In an alternative embodiment, the vehicle system only includes the propulsion-generating vehicle such that the propulsion-generating vehicle is not coupled to the non-propulsion-generating vehicle or another kind of vehicle. In yet another embodiment, the vehicles in the vehicle system, including propulsion and non-propulsion vehicles are logically or virtually coupled together, but not mechanically coupled together.

In one embodiment, the vehicle system may include a pneumatic braking system in which all of the vehicles in the vehicle system are connected together pneumatically by a brake pipe that is kept at a predetermined pressure, for example 5 bar, and keeps the brakes of all of the vehicles open. The first vehicle may include a first traction device and a first braking device for controlling the speed and motion of the vehicle system. In one example, the traction device may include a throttle, accelerator, or the like. In another example, the first braking device may include a brake cock. For example, a pressure drop in the brake pipe, caused by actuating a brake cock in the driving cab of the lead vehicle may propagated throughout the entire vehicle system and reach the braking equipment on the individual vehicles. A distributor in said vehicles, which is usually associated with a control cylinder and an auxiliary cylinder, causes air to enter the brake cylinders, thereby braking the vehicle system. A subsequent pressure increase in the brake pipe again releases the brakes on the vehicle system.

Figure 2:
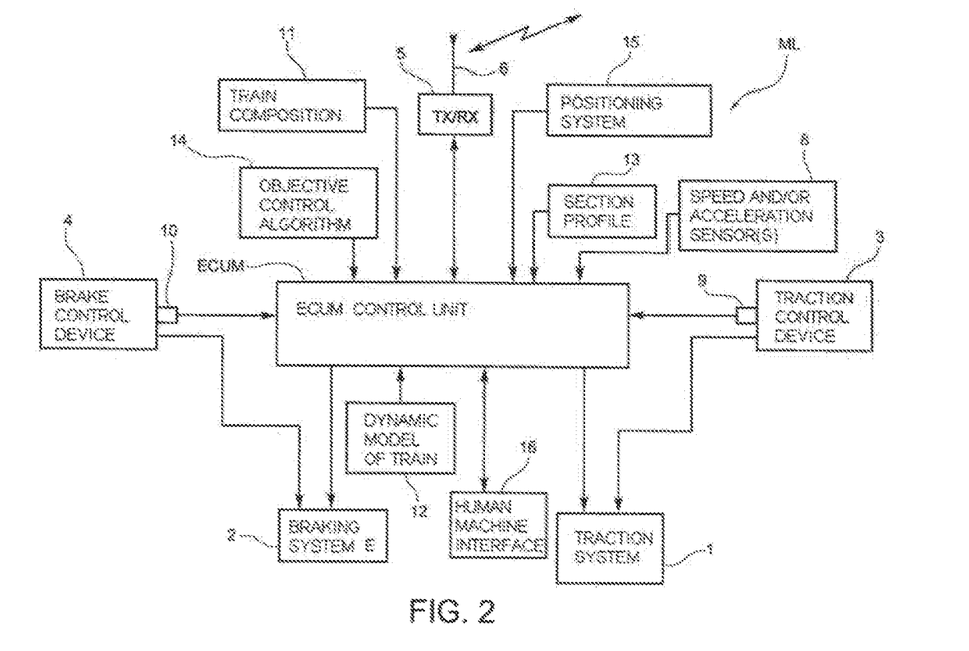
FIG. 2 is a block diagram showing the equipment of a vehicle of a vehicle system.
Figure 3:
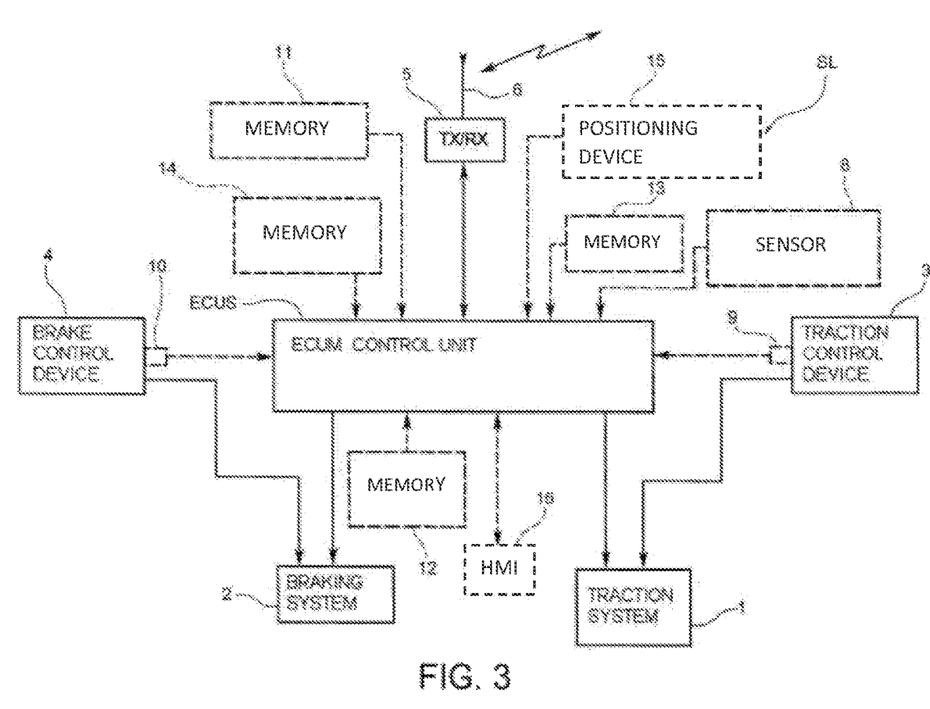
FIG. 3 is a block diagram showing the equipment of a vehicle of a vehicle system.

The block diagrams in FIGS. 2 and 3 illustrate the elements of the equipment on the first vehicle and respectively a second vehicle of the vehicle system. In particular, the control unit ECUM of each vehicle is the same. In this manner, FIGS. 2 and 3 illustrate a first control unit, second control unit, third control unit etc. Specifically, each propulsion vehicle includes an identical control unit with the equipment illustrated in FIGS. 2 and 3.

The first vehicle and second vehicle each have respective traction system 1 and braking system 2, which are associated with corresponding first traction device 3 and first braking device 4 that can each be actuated manually by an operator.

The first control unit may also be provided with transceiver devices 5 that enable the control units to communicate with one. In one example, the first control unit may be an electronic control unit (ECU). In the embodiment shown by way of example, the transceiver devices are able to communicate with one another by radio, using a respective antenna 6. Alternatively, communication between transceiver devices may be achieved using other channels, such as cables, optical fibers, cellular communication, over the air communication, Wi-Fi communication, or the like.

In the traction and braking control system, the first control unit of the first vehicle is associated with and communicates with sensor devices 8 that may provide electrical signals indicating the speed and/or acceleration of the first vehicle. The first control unit may also be linked to detector devices 9 and 10 designed to generate operator input command signals indicating the inputs given by the operator of the first vehicle using the first traction device and, respectively, the first braking device.

The first control unit also includes one or more memory devices 11, 12, 13, 14 that store data. The data stored may include data describing the composition of the vehicle system. The first control unit additionally may include other memory devices that may contain data used to define a mathematical model of the longitudinal dynamics of the vehicle system. The memory devices may store data used to define the profile of the section of a route on which the vehicle system is travelling. In another example, the other memory devices are used to store data defining a control algorithm and at least one predetermined operational objective. The memory devices may also include instructions that when executed by one or more processors of the control system result in operating the first traction device and the first braking device.

With reference to FIG. 2, the first control unit of the first vehicle is also associated with and in communication with positioning devices 15 of a positioning system that may provide signals that include position data indicating the instantaneous position of the first vehicle, and therefore of the vehicle system, along the aforementioned section. The positioning devices may be inertial and/or satellite platforms, or other systems.

The first control unit may also include a human-machine interface 16 that is designed to provide information/instructions to the operator of the first vehicle. In one example, the first control unit may control a traction control unit and braking device of the vehicle system in the manner described below.

The first control unit in one example may check that the commands, or inputs, given by the operator of the first vehicle to the traction control unit and/or a braking device (and therefore of the vehicle system) are consistent with a predetermined operational objective stored in a memory device. The operational objective may for example be to reduce the dynamic stresses exchanged between the different vehicles that make up the vehicle system during vehicle system movement. An alternative or additional operational objective may be, for example, maintaining a constant assigned speed in a route section such as a track section, subject to a speed limit.

The consistency of the operator input command signals generated as a result of operator inputs using the traction and braking control devices with the aforementioned operational objectives may be checked using the information contained in the memory device. The information may include the composition of the vehicle system, mathematical model of the dynamic behavior of the vehicle system, route profile, control algorithm, operational objectives, etc., along with the information provided by the positioning system, and the information provided by the detector devices associated with the traction and braking control devices.

In one example, the first control unit operates the first tracking device and braking device based upon, and in response to an operator input command signal. The operator input may be to speed up the vehicle system, brake the vehicle system, or the like. The first control unit does not operate the first vehicle in response to, or based on an operational objective. Instead, the first control unit checks whether the command signal based on the input of the operator is consistent with an operational objective. If consistent, the first control unit takes no further actions. However, if the command signal is determined to not be consistent with an operational objective, the control system may provide the operator instructions based on the command signal and at least on operational objective. In one example, the instruction is placed on the human-machine interface. In another example, the instruction is to reduce speed in response to the command signal indicating an increase in speed. In all, the first control unit allows the operator to stay in control of the first vehicle at all times and does not provide commands for the traction device or the braking device. Instead, the first control unit only provides instructions to the operator that the operator input will result in an operational objective not being met.

The first control unit may also use the information received from the memories, positioning system, detector devices, etc. to generate traction and/or braking control signals for the second vehicle. The control signals may be sent to a second control unit of the second vehicle using the transceiver devices.

In each second vehicle, the traction and braking control signals from the first control unit of the first vehicle are received by a second control unit of the second vehicle that controls a second traction device and second braking device of the corresponding second vehicle accordingly.

The second control unit operates the second traction device and second braking device based on at least one operational objective. The operational objective may be a determined average speed, determined fuel efficiency, an emissions output, a schedule, or the like. In one example, the second control unit obtains the operational objective from the first control unit. In one example, the operational objective may be stored in a memory of the first control unit and communicated from the first control unit to the second control unit using the transceivers of the first control unit and second control unit. Alternatively, the one or more processors of first control unit may analyze sensor data, speed data, position data from the position system, operator input command signals, a combination thereof, or the like to either determine the operational objective or check if an operator input command signal is consistent with the operational objective. The first control unit may then communicate such information to the second control unit. In another embodiment, one or more processors of the second unit controller obtain the operational objective from a memory of the second control unit, and/or determines the operational objective, or whether a command signal is consistent with an operational objective. To this end, the second control unit may obtain sensor signals, positioning data, etc. to make such determinations. In each instance, the one or more processors of the second control unit may operate the second traction device and/or second braking device. In one example, the second control unit operates the second traction device and/or second braking device based only on the operational objective and not based on a command signal. Specifically, the second control unit may operate autonomously from the operator such that the second control unit does not operate the second traction device and/or second braking device in response to an operator input to generate an operator input command signal.

In the embodiment described thus far, control of the traction and braking of the first vehicle is left completely to the operator, and the first control unit can be arranged appropriately to provide said operator, by means of the human-machine interface, with information/recommendations regarding the consistency of the commands given by the operator with the operational objective or objectives assigned.

In another embodiment, traction and control of the first vehicle is controlled in part using the commands generated by manual inputs of the operator using the first control unit, and in part using control signals generated by the first control unit on the basis of information provided to said first control unit by the devices.

This "mixed" traction and braking control method for the first vehicle helps to optimize management of the movement of the vehicle system. The control and decision algorithm implemented by the first control unit can be implemented using artificial-intelligence techniques, for example using neural networks or Petri nets. The control system according to the present invention helps to optimize management of the longitudinal dynamics of the vehicle system as a function of the profile of the route section being traveled, and to improve the performance of such a vehicle system under specific circumstances (starting, braking, skid conditions, etc.).

Comparison of the block diagrams in FIGS. 2 and 3 shows how the equipment architecture in each trailing vehicle is similar to the equipment architecture in the first vehicle.

In general, to implement the aforementioned control methods, each second vehicle only strictly requires the devices shown in FIG. 3 using an unbroken line.

Nonetheless, it may be beneficial for the first vehicle and second vehicles to be fitted with the same equipment that can be operated selectively because the first vehicle equipment or second vehicle equipment, such that each first vehicle can, as required, be used as a first vehicle or a second vehicle. Accordingly, the equipment architecture shown in FIG. 3 can therefore be augmented by adding the devices shown in said figure using a dotted line, which are indicated using the same reference signs as used in FIG. 2.

In one or more example embodiments, a vehicle system is provided that may include a first vehicle having a first traction device and a first braking device. The first vehicle may also have a first control unit including a first sensor that may provide first speed signals indicating one or more of a speed or an acceleration of the first vehicle. The first control unit may also include a second sensor may obtain an operator input command signal. The first control unit may also include one or more processors may operate the first traction control unit and the first braking device based on the command signal. The vehicle system may also include a second vehicle having a second traction device and a second braking device. The second vehicle may also have a second control unit in communication with the first control unit. The second control unit may also include one or more processors may operate the second traction device and the second braking device based on at least one operational objective of the vehicle system.

Optionally, the one or more processors of the first control unit may also provide the operator with instructions based on the command signal and the at least one operational objective. In one aspect, the instructions can include how to operate both the first traction device and the first braking device of the first vehicle. In another aspect, the one or more processors of the first control unit may check whether the command signal is consistent with the at least one operational objective of the vehicle system. The one or more processors may also provide the operator with the instructions based on whether the command signal is consistent with the at least one operational objective of the vehicle system. In one example, the first control unit may be a first electronic control unit, and the second control unit may also be a second electronic control unit.

Optionally, the vehicle system may also include a positioning system that may obtain position data in communication with the first control unit, and the second control unit. The one or more processors of the second control unit may also operate the second traction device and the second braking device based on the position data obtained by the positioning system. In one aspect, the at least one operational objective may be a reduction in a dynamic stress exchanged between two or more of the first vehicle, or the second vehicle. In another aspect, the at least one operational objective may be maintaining a constant assigned speed of the vehicle system.

In one or more embodiments, a method is provided that may include obtaining with a first control unit of a first vehicle of a vehicle system at least one operational objective of the vehicle system, and receiving an operator input command signal. The method may also include operating a first traction device and a first braking device based on the command signal, and obtaining with a second control unit of a second vehicle of the vehicle system the at least one operational objective. The method may also include operating a second traction device and a second braking device based on the at least one operational objective.

Optionally, the method may also include receiving with the second control unit speed signals from a first sensor, and operating the second traction device and the second braking device based on the speed signals. In one aspect, the method may also include receiving with the second control unit position data from a positioning system, and operating second traction device and the second braking device based on the position data. The method may also include obtaining, with the first control unit the at least one operational objective, and analyzing, with the first control unit, whether the operator input command signal is consistent with the at least one operational objective. The method may also include providing, with the first control unit, instructions to the operator based on whether the command signal is consistent with the at least one operational objective. In one example, checking whether the command signal is consistent with the at least one operational objective may include obtaining at least one of speed signals from a first sensor, or position data from a positioning system, and determining whether the command signal is consistent with the at least one operational objective based on the speed signals or the position data. In another aspect, the at least one operational objective may be a reduction in a dynamic stress exchanged between two or more of the first vehicle, the or the second vehicle. In one example, the at least one operational objective may be maintaining a constant assigned speed of the vehicle system.

In one or more embodiments, a vehicle system is provided that may include a first vehicle having a first traction device and a first braking device. The first vehicle may also have a first control unit including a first sensor that may provide first speed signals during a trip indicating one or more of a speed or an acceleration of the first vehicle. The first control unit may also include a second sensor that may obtain an operator input command signal during the trip based on an input given by an operator to the first traction device or the first braking device. The first control unit may also include one or more processors that may operate the first traction control unit and the first braking device based on the command signal and in response to receiving the command signal. The vehicle system may also include a second vehicle having a second traction device and a second braking device. The second vehicle may also have a second control unit in communication with the first control unit. The second control unit may include one or more processors that may operate the second traction device and the second braking device based on at least one operational objective of the vehicle system, and not in response to receiving the command signal.

Optionally, the one or more processors of the first control unit may also provide the operator with instructions based on the operator input and the at least one operational objective. In one aspect, the instructions may include how to operate both the first traction device and the first braking device of the first vehicle. In another example, the one or more processors of the first control unit may check whether the command signal is consistent with the at least one operational objective of the vehicle system, and provide the operator with the instructions based on whether the command signal is consistent with the at least one operational objective of the vehicle system. In yet another example, the vehicle system may also include a positioning system that may obtain position data in communication with the first control unit, and the second control unit. The one or more processors of the second control unit may operate the second traction device and the second braking device based on the position data obtained by the positioning system.

Naturally, notwithstanding the principle of the invention, the means of implementation and the specific embodiments may vary greatly from that described and illustrated purely by way of a non-limiting example, without thereby moving outside the scope of the invention as defined in the attached claims.

In some example embodiments, the device performs one or more processes described herein. In some example embodiments, the device performs these processes based on processor executing software instructions stored by a computer-readable medium, such as a memory and/or a storage component. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into a memory and/or a storage component from another computer-readable medium or from another device via the communication interface. When executed, software instructions stored in a memory and/or a storage component cause the processor to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

In one embodiment, the maintenance system may have a local data collection system deployed that may use machine learning to enable derivation-based learning outcomes. The maintenance system may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the maintenance system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The maintenance system may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models is obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a sensor configured to obtain signals indicating a speed or acceleration of a vehicle system;
   a first control unit having one or more processors configured to:
      receive the signals indicating the speed or the acceleration of the vehicle system;
      operate a first traction device and a first braking device of a first vehicle of the vehicle system based on an operator input command signal;
      check whether the operator input command signal is consistent with at least one operational objective;
      provide the operator with instructions on how to operate the first traction device and the first braking device to achieve the at least one operational objective; and
   a second control unit in communication with the first control unit and having one or more processors configured to:
      receive the signals indicating the speed or the acceleration of the vehicle system; and
      operate a second traction device and a second braking device of a second vehicle of the vehicle system based on the at least one operational objective of the vehicle system and the signals indicating the speed or the acceleration of the vehicle system.

2. The system of claim 1, further comprising a memory configured to store model data defining a mathematical model of longitudinal dynamics of the vehicle system, route data that defines a profile of a section of a route the vehicle system is traveling, and the operational objective.

3. The system of claim 2, further comprising a positioning system configured to obtain position data in communication with the first control unit, and the second control unit, wherein the one or more processors, of the second control unit are configured to operate the second traction device and the second braking device based on the position data obtained by the positioning system.

4. The system of claim 3, wherein the one or more processors of the first control unit are further configured to:
   generate, in a determined manner and as a function of data stored in the memory and the signals indicating the speed or the acceleration of the vehicle system and the position data, control signals for controlling traction or braking; and
   transmit the control signals to the second control unit.

5. The system of claim 1, wherein the one or more processors of the second control unit operate the second traction device and the second braking device based on a communication from the first control unit.

6. The system of claim 1, further comprising:
   a positioning system configured to obtain position data in communication with the first control unit, and the second control unit, wherein the one or more processors, of the second control unit are configured to operate the second traction device and the second braking device based on the position data obtained by the positioning system.

7. The system of claim 1, wherein the at least one operational objective is a reduction in a dynamic stress on the first vehicle or the second vehicle.

8. The system of claim 1, wherein the at least one operational objective is maintaining an assigned speed of the vehicle system.

9. A method comprising:
   obtaining at least one operational objective of a vehicle system with a first control unit of a first vehicle of the vehicle system;
   storing model data defining a mathematical model of longitudinal dynamics of the vehicle system, route data that defines a profile of a section of a route the vehicle system is traveling, and the at least one operational objective;
   receiving an operator input command signal with the first control unit;
   operating a first traction device and a first braking device based on the operator input command signal;
   obtaining the at least one operational objective with a second control unit of a second vehicle of the vehicle system; and
   operating a second traction device and a second braking device with the second control unit based on the at least one operational objective and the model data defining the mathematical model of the longitudinal dynamics of the vehicle system.

10. The method of claim 9, further comprising:
    receiving speed signals from a first sensor with the second control unit; and
    operating the second traction device and the second braking device based on the speed signals.

11. The method of claim 9, further comprising:
    receiving position data from a positioning system with the second control unit; and
    operating the second traction device and the second braking device based on the position data.

12. The method of claim 9, further comprising,
    obtaining the at least one operational objective with the first control unit;
    analyzing whether the operator input command signal is consistent with the at least one operational objective, with the first control unit; and
    providing instructions to an operator based on whether the operator input command signal is consistent with the at least one operational objective with the first control unit.

13. The method of claim 12, wherein analyzing whether the operator input command signal is consistent with the at least one operational objective includes obtaining at least one of speed signals from a first sensor, or position data from a positioning system; and determining whether the operator input command signal is consistent with the at least one operational objective based on the speed signals or the position data.

14. The method of claim 9, wherein the at least one operational objective is a reduction in a dynamic stress on the first vehicle or the second vehicle.

15. The method of claim 9, wherein the at least one operational objective is maintaining a constant assigned speed of the vehicle system.

16. A system comprising:
a first control unit including a first sensor configured to provide first speed signals during a trip indicating one or more of a speed or an acceleration of a first vehicle, the first control unit also including a second sensor configured to obtain operator input command signals from an operator during the trip;
the first control unit also including one or more processors configured to:
operate a first traction control unit and a first braking device based on the command signals and in response to receiving the operator input command signals;
provide the operator with instructions on how to operate a first traction device and the first braking device to achieve at least one operational objective; and
a second control unit in communication with the first control unit, the second control unit including one or more processors configured to:
operate a second traction device and a second braking device based on the at least one operational objective, and not in response to receiving the operator input command signals.

17. The system of claim 16, the one or more processors of the first control unit are further configured to provide the operator with instructions based on the operator input command signals and the at least one operational objective.

18. The system of claim 17, wherein the instructions include how to operate at least one of the first traction device or the first braking device of the first vehicle.

19. The system of claim 18, wherein the one or more processors of the first control unit are configured to analyze whether the operator input command signal is consistent with the at least one operational objective; and provide the operator with the instructions based on whether the operator input command signal is consistent with the at least one operational objective.

20. The system of claim 16, further comprising a positioning system configured to obtain position data in communication with the first control unit, and the second control unit, wherein the one or more processors of the second control unit are configured to operate the second traction device and the second braking device based on the position data obtained by the positioning system.

* * * * *